3,449,288
HIGH TEMPERATURE PHOSPHORUS CONTAINING MOLDING COMPOSITIONS AND CERAMICS

James M. Maselli, Baltimore, and Rip G. Rice, Ashton, Md., assignors to W. R. Grace & Co., New York, N.Y., a corporation of Connecticut
No Drawing. Filed Jan. 7, 1966, Ser. No. 519,198
Int. Cl. C08g 49/00; C04b 35/00
U.S. Cl. 260—37         2 Claims

ABSTRACT OF THE DISCLOSURE

A process for preparing a ceramic molding composition comprising mixing a siliceous compound with a binding composition comprising phosphonitrilic chloride-polyhydric alcohol condensates.

---

The present invention relates to the production of ceramics, and more specifically to a novel ceramic molding composition and temperature resistance of objects obtained therefrom.

Ceramic materials which are used in modern technology must possess not only resistance to high temperatures, but must also be dimensionally stable and resistant to impact when in use and during processing.

It is therefore an object of the present invention to provide improved ceramic molding composition.

It is another object to provide a ceramic molding composition from which accurately molded high temperature resistant ceramic objects may be prepared.

These and still further objects of the present invention will become readily apparent from the following detailed description and specific examples.

Broadly, the present invention contemplates ceramic molding compositions which comprises (1) a particulate, siliceous material, and (2) a bonding composition comprising a phosphorus containing compound. Useful high temperature resistant ceramic objects may be prepared from the above compound when the ingredients thereof are (1) blended in the required amounts, (2) molded and cured at temperatures sufficient to polymerize the resin, and finally (3) fired at a temperature in excess of 1000° F.

More specifically, we have found that strong, tough, dimensionally stable, ceramic moldings may be readily obtained by using our novel molding composition which comprises the following ingredients: (1) from about 60 to about 90 parts by weight of a particulate, siliceous compound such as silica, vermiculite and/or wollastonite, and (2) from about 10 to about 40 parts by weight of a binding composition which comprises from about 3 to about 6 parts by weight based on phosphorus of a high temperature bonding agent such as polyphosphonitriles.

To prepare ceramic moldings from our novel compositions, the above components are preferably intimately admixed in the desired ratio, then molded to the desired shape. Since the present composition undergoes substantially no dimensional changes during curing and firing, the initial molded shape may be substantially the same size as the desired finished article.

Subsequent to molding, the required shape is then preferably cured at a temperature sufficiently high to polymerize the organic resin bonding component. Ordinarily, temperatures on the order of from about 150° C. to about 250° C. are sufficient for this purpose wherein curing of the thermoset resin is achieved in from about 30 to about 90 minutes.

Subsequent to curing of the molded object, a molded article is obtained which is then ready for firing at temperatures ranging from about 600 to about 1000° C. The precise time required to fire a given molded object depends on the size and shape thereof. However, complete firing is ordinarily obtained at from about 4 to about 10 hours. The fired ceramic object contains substantially no carbon and possesses substantially the same size and shape as the original molded object. The ceramic objects are strong and exceedingly tough and can withstand temperatures as high as about 1200° C. for indefinite periods. X-ray analysis of the ceramics indicates the presence of crystalline $SiO_2 \cdot P_2O_5$ which it is believed acts as the binding agent.

As indicated above, the present method for preparing ceramic objects preferably comprises three separate steps. They are: (1) the preparation of the molding mixture and the shaping thereof, (2) curing at a temperature sufficient to polymerize the binding component and thereby form a physically durable molded object which readily withstands handling prior to and during curing, (3) firing at elevated temperatures. It is contemplated however, that the immediate curing step wherein the resin is polymerized may be merged into the final firing step. However, it is generally preferred that the present molding operation be carried out in three individual operations.

The siliceous material utilized in the present molding compositions may be of a synthetic or naturally occuring origin. Typically, siliceous material such as vermiculite, wollastonite, ground glass, silica fiber may be utilized.

The resin component is one which is compatible with the siliceous material and which preferably cures at a temperature range of from about 150 to about 250° C. The thermosetting cyclic phosphonitrilic chloride-polyhydric alcohol condensates may be used. These phosphorus containing resins may serve the dual function of thermoset binding agent and phosphorus donating compound.

The phosphorus containing component utilized in the present composition serves as a high temperature binding agent. That is, when the present molded objects are fired at elevated temperatures, substantially all carbon contributed by the thermoset resin component is driven out of the molded composition. The phosphorus component remains in the composition to form which appears to be $SiO_2 \cdot P_2O_5$ residues. These phosphorus silica residues it appears constitute a strong, tough bonding characteristic to the fired ceramic mass. While the precise nature of the bonding phenomena contributed by phosphorus is not entirely understood, it is believed the strength derived from the present composition is attributable to the phosphorus containing component. Typical phosphorus compounds which may be used are both of semi-organic and totally inorganic nature. For example, the phosphorus containing compound may comprise an organic substituted cyclic phosphonitrilic ring system.

While the necessary components of the present molding composition comprises a siliceous material, a phosphorus donating compound and a resin, it is contemplated that other reenforcing materials such as metallic powders and fragments may be readily incorporated in the present ceramic compositions to give a desired characteristic to the resultant article.

The present ceramic compositions find use as high temperature resistant linings for combustion chambers, insulators and so forth.

Having described the basic aspects of the present invention, the following examples are given to illustrate embodiments thereof.

EXAMPLE I

A mixture comprising 65% wollastonite, 31.5% of a phenylphosphonitrilic chloride-hydroquinone condensation product prepared by condensing one mole of $(\phi PNCl)_3$, ($\phi$=phenyl) and three moles of hydroquinone at 80° C. for 60 min., and 3.5% hexamethylene tetramine was molded at 2000 p.s.i. at a temperature of 450° for one hour. Molding was then fired in a muffle furnace at a temperature of 1800° F. for four hours. A tough, white ceramic object having substantially the same dimensions as the pre-fired molding was obtained. The emission spectrum of the ceramic object indicated phosphorus to be present.

EXAMPLE II

A condensation product was prepared by condensing one mole of $(\phi POCl)_2$ and two moles of hydroquinone at a temperature of 80° C. for 60 min. 20% by weight of this condensate was admixed with 5% by weight hexamethylene tetramine and 75% by weight of ground silica fibers. This mixture was then molded at 2000 p.s.i. at 500° F. for one hour. The molded object was then fired for four hours at 1800° F. whereupon a tough, white, ceramic object was obtained. The emission spectrum obtained from this ceramic indicated the presence of phosphorus.

EXAMPLE III

A mixture comprising 75% by weight of ground silica fiber, 22.5% by weight of the hydroquinone $(\phi PNCl)_3$ condensation product described in Example I, and 2.5% by weight of hexamethylene tetramine was molded in a 5 x 5 x 1/8 inch mold which was heated at 450° F. for one hour. Six 5 x 1/2 x 1/8 inch samples were then cut from the molding. Three of these samples were pyrolized by heating in a muffle furnace at a temperature of 18° F. for 5 hours to produce ceramic strips. Flexural strengths were compared with the unfired samples. The flexural strengths in terms of p.s.i. at rupture, was 4325 for the unfired material and 2299 for the fired material. X-ray analysis indicated the existence of $SiO_2 \cdot P_2O_5$ in the ceramics. Comparison in chemical analysis of the fired and non-fired products indicated the phosphorus content did not change significantly upon firing.

EXAMPLE IV

To confirm the present belief that the present ceramic materials contained an $SiO_2 \cdot P_2O_5$ residue which adds to the binding strength of the ceramic objects, a mixture comprising 80% colloidal $Al_2O_3$ and 20% by weight of the phenylphosphonitrilic-hydroquinone condensate product used in Example III was combined and molded at 2000 p.s.i. at 450° F. for one hour. This molded object was then fired at 1800° F. for 16 hours. A chalky product was obtained which possessed substantially no physical strength.

It is concluded from this example that the present compositions containing both phosphorus and silica yield novel ceramic materials which cannot be obtained using other non $SiO_2$ containing inorganic filler materials commonly used in the preparation of ceramics.

We claim:

1. A ceramic molding composition consisting essentially of (1) 60 to 90 parts of a particulate siliceous material and (2) 10 to 40 parts of a binding composition comprising phenylphosphonitrilic chloride-hydroquinone condensation product.

2. A ceramic molding composition consisting essentially of (1) 60 to 90 parts of silica fibers and (2) 10 to 40 parts of a phenylphosphonitrilic chloride-hydroquinone condensation product.

References Cited

UNITED STATES PATENTS 2,521,614   9/1950   Valyi _____ 106—69
2,802,749   8/1957   West et al. _____ 106—69

JAMES E. POER, *Primary Examiner.*

U.S. Cl. X.R.

106—39, 46, 63, 69